(12) United States Patent
Heberer

(10) Patent No.: US 7,586,062 B2
(45) Date of Patent: Sep. 8, 2009

(54) LASER BOOTH WITH DEVICE FOR SHIELDING COHERENT ELECTROMAGNETIC RADIATION

(75) Inventor: Erwin Martin Heberer, Heusenstamm (DE)

(73) Assignee: FFT EDAG Produktionssysteme GmbH & Co. KG, Fulda (DE)

( * ) Notice: Subject to any disclaimer, the term of this patent is extended or adjusted under 35 U.S.C. 154(b) by 679 days.

(21) Appl. No.: 10/559,106

(22) PCT Filed: Jun. 7, 2004

(86) PCT No.: PCT/EP2004/006129
§ 371 (c)(1),
(2), (4) Date: Dec. 2, 2005

(87) PCT Pub. No.: WO2004/108343
PCT Pub. Date: Dec. 16, 2004

(65) Prior Publication Data
US 2007/0023406 A1    Feb. 1, 2007

(30) Foreign Application Priority Data
Jun. 5, 2003    (DE)  ................................ 103 25 906

(51) Int. Cl.
*B23K 26/00* (2006.01)
*B23K 26/12* (2006.01)
(52) U.S. Cl. ................................. 219/121.86
(58) Field of Classification Search ............. 219/121.6, 219/121.61, 121.86
See application file for complete search history.

(56) References Cited

U.S. PATENT DOCUMENTS 3,617,727 A * 11/1971 Balfour-Lynn ................ 362/20
4,793,715 A * 12/1988 Kasner et al. .................. 374/6
4,901,080 A * 2/1990 McHenry ........................ 342/1
4,978,214 A * 12/1990 Kawata ....................... 353/114
4,990,782 A * 2/1991 Wellman et al. ............. 250/352
5,591,361 A    1/1997 Hostler et al. ........... 219/121.82
5,634,923 A * 6/1997 Brenner et al. ................ 606/10
5,658,476 A    8/1997 Gullo et al. ............ 219/121.86
5,745,293 A * 4/1998 Lassalle ....................... 359/614
5,817,088 A * 10/1998 Sterling ........................ 606/4
6,107,597 A * 8/2000 Staschewski et al. ... 219/121.63
6,147,320 A    11/2000 Bernecker et al. ...... 219/121.68
6,147,323 A    11/2000 Erickson et al. ........ 219/121.86
6,686,560 B2 * 2/2004 Pratt et al. ............. 219/121.86
2002/0134773 A1    9/2002 Pratt et al. ............. 219/121.86
2003/0217641 A1* 11/2003 Palestro et al. ................ 95/273
2007/0062060 A1*  3/2007 Swoboda ..................... 34/275

FOREIGN PATENT DOCUMENTS

DE    3013720 A  * 10/1981

OTHER PUBLICATIONS

VDE Monograph Series, 104, "Schutz vor optischer Stralung", Dr. Ernst Sutter, 2nd Edition 2002, VDE Verlag GMGH—Berlin—Offenbach ("Protection From Optical Radiation") and translation.

* cited by examiner

*Primary Examiner*—Samuel M Heinrich
(74) *Attorney, Agent, or Firm*—Charles P. Boukus, Jr.

(57) ABSTRACT

The invention relates to a device for shielding coherent electromagnetic radiation, especially laser radiation. The device comprises at least two partially converging faces (6, 7) between which two opposite openings (8, 9) are configured. The distance of the faces (6, 7) between the two openings (8, 9) varies to such an extent that the electromagnetic radiation is prevented from going from the one opening (8) straight through the other opening (9).

10 Claims, 5 Drawing Sheets

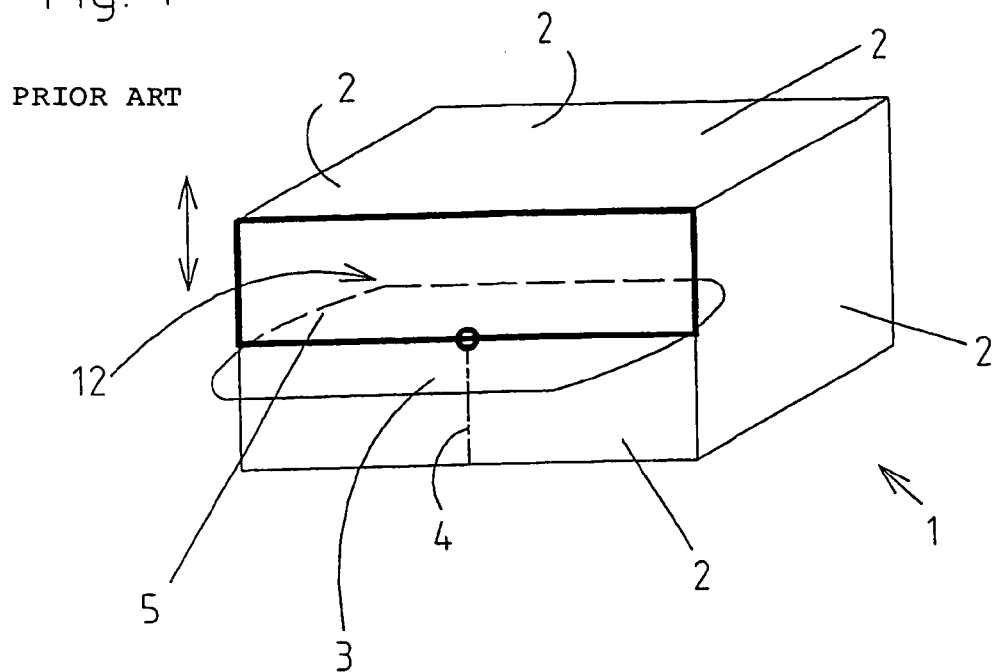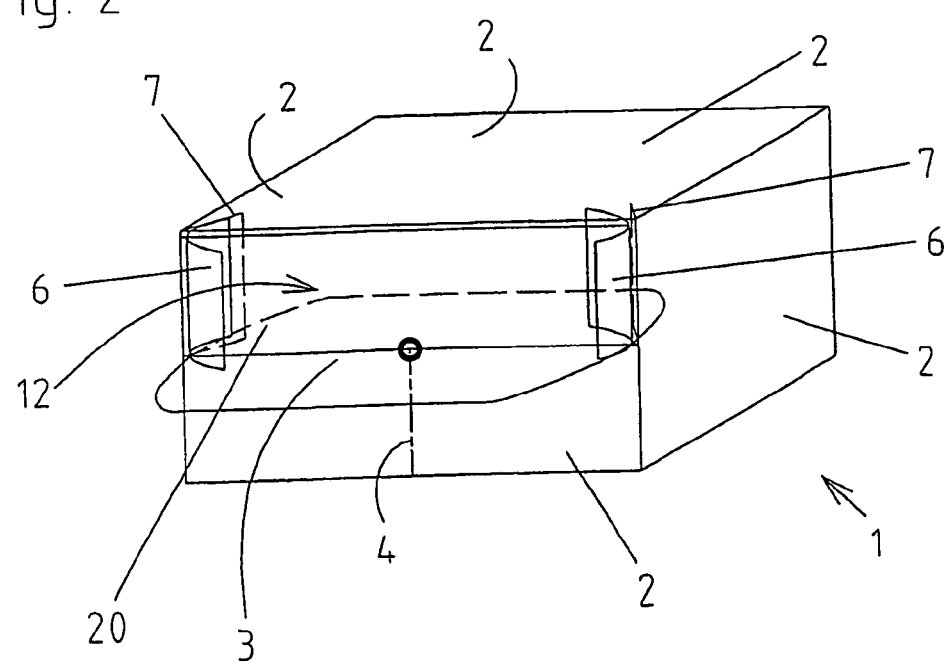

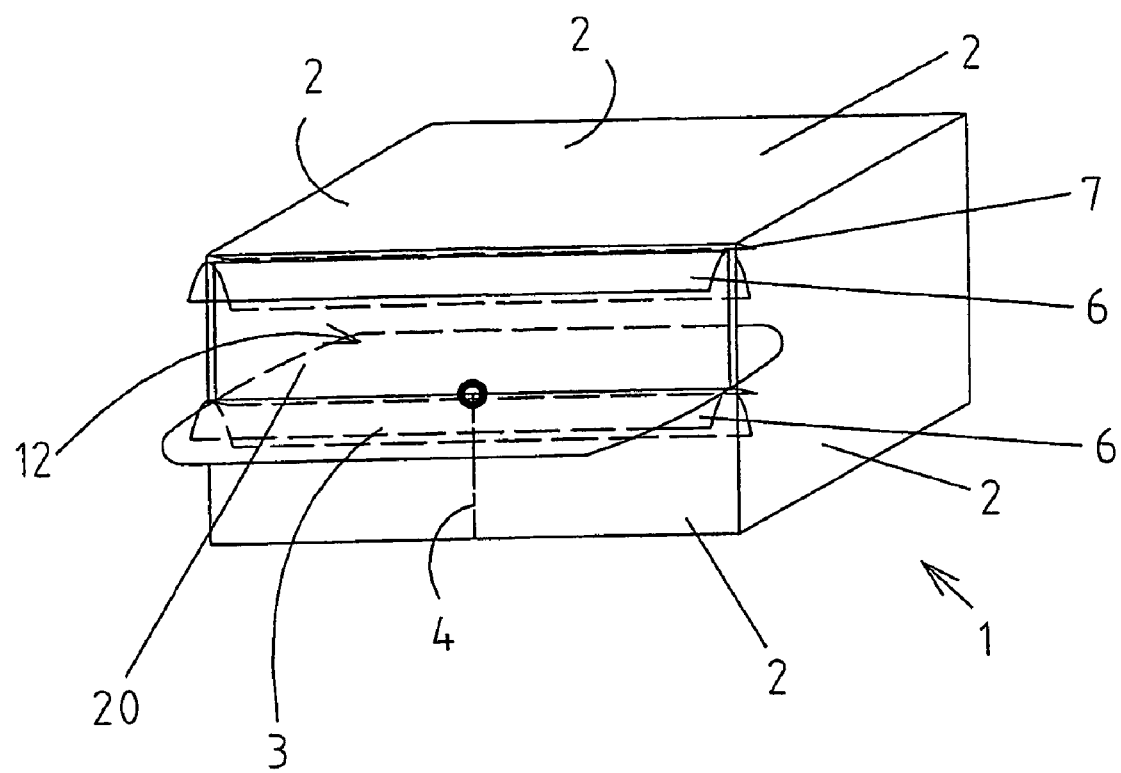

LASER BOOTH WITH DEVICE FOR SHIELDING COHERENT ELECTROMAGNETIC RADIATION

Figure 3:
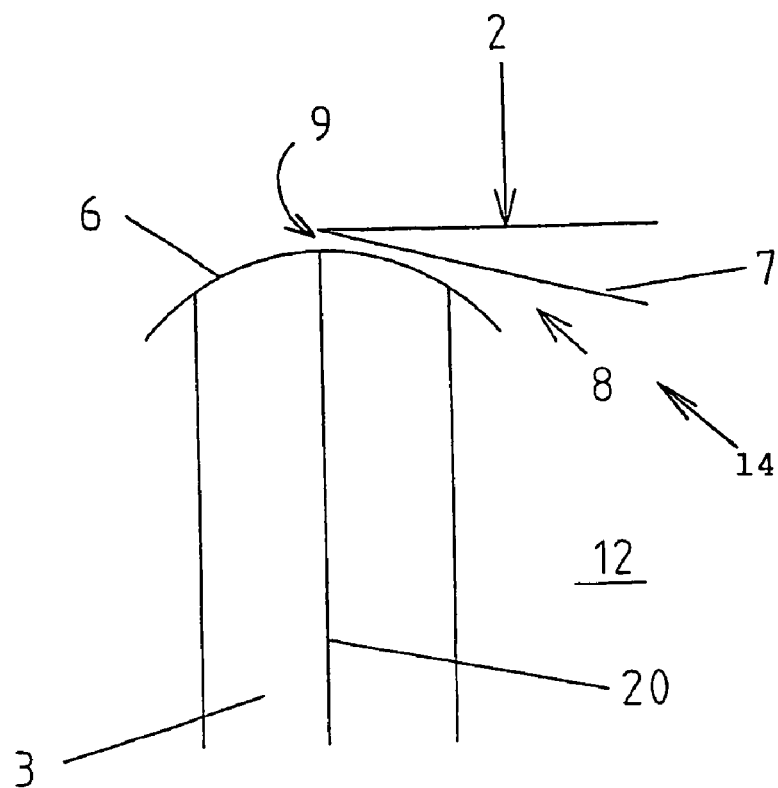

The invention relates to a device for shielding coherent electromagnetic radiation and to the use of the device of the invention in laser welding booths and for shielding coherent electromagnetic radiation in work processes.

In the industry, sources of coherent electromagnetic radiation, such as lasers, are increasingly used for machining material, as in welding, soldering and cutting, and in surface treatment. For reasons of radiation safety, this process takes place in closed or encapsulated booths. However, to introduce the workpiece into the booth, transfer openings for robots or transfer devices, such as turntables, are needed. Such transfer openings are closed with rolling or lifting gates, so that during the machining of the workpiece, a complete encapsulation of the machining chamber is accomplished. This is necessary so that the MPR (maximum permissible radiation) values outside the machining chamber will not be exceeded.

In FIG. 1, a laser booth of the prior art is shown. The laser booth 1 substantially comprises a plurality of laser-protection walls 2, a turntable 3, and a lifting gate 5. The lifting gate 5 is movable in the direction of the arrow. The turntable 3, in the exemplary embodiment shown here, is rotatable via a pivot axis 4 such that half of the turntable 3, with a receptacle for a workpiece, is located inside the laser booth 1 while the other half of the turntable 3, with a second receptacle, is located outside the laser booth. Before a workpiece is machined by the laser in an inner chamber 12 of the laser booth 1, the lifting gate is moved downward, so that a complete encapsulation of the interior 12 of the laser booth 1 from environment is accomplished. In this state, it is not possible for the laser radiation to get out of the interior 12 into the environment.

While the workpiece is being machined in the inner chamber 12, a further workpiece, which is machined in a subsequent machining step, can be placed on the second receptacle of the turntable 3. However, before the machined workpiece is rotated out of the inner chamber 12 by means of the turntable 3, and the workpiece that has not yet been machined is rotated into the inner chamber 12, the lifting gate 5 must be moved upward again, so that a transfer opening for the workpieces is created. During the time while the lifting gate 5 of the booth is being opened and closed, machining of the workpiece is not possible, which leads to correspondingly long cycle times in production.

So-called conical receivers for measuring laser energy are already known, for instance from *Schutz vor optischer Strahlung* [Protection from Optical Radiation] by Dr. Ernst Sutter, VDE-Verlag GmbH, second edition, 2002, page 83. In it, hollow-conical absorption faces are used as absolute receivers or laser beam measurement. The opening angle of the cone is less than 20°, the laser radiation to be measured enters the conical receiver parallel to the cone axis. In its further course, the laser radiation is reflected toward the tip of the cone. In the case of radiation entering parallel to the cone axis, the number Z of reflections occurs before the beam emerges from the cone again, at an opening angle α of the cone of $Z=180°/\alpha$. It follows that coherent electromagnetic radiation entering parallel to the cone axis will not reach the tip of the cone but instead, because of the reflections that occur, will exit from the cone opening again. Even if the degree of reflection of the absorption faces of the hollow cone is not very low, still because of the large number of reflections, only a vanishingly small fraction of the radiation emerges from the cone again.

Based on this, it is the object of the invention to refine a device of the type defined at the outset such that it unnecessary to encapsulate the chamber in which the radiation source of the coherent electromagnetic radiation is used.

This object is attained by means of a device for shielding coherent electromagnetic radiation, in particular laser radiation, having at least two faces converging toward one another at least in some portions, between which two diametrically opposed openings are formed, wherein the spacing of the faces between the two openings varies such that a direct passage of electromagnetic radiation from one opening into the other opening is prevented.

Advantageous features of the invention are defined by the dependent claims.

According to the invention, two faces converge toward one another, which between them form two diametrically opposed openings; the spacing of the faces between the two openings varies such that a direct passage of the coherent electromagnetic radiation from one entrance opening into the other opening is prevented. It is thus attained that practically no radiation escapes from a work chamber to the outside, yet complete encapsulation of the work chamber is not required. Instead, the coherent electromagnetic radiation is reflected back toward the radiation sources from the converging faces.

To achieve the highest possible degree of reflection of the two faces converging toward one another, these faces should form an angle of 10° to 30°, preferably $\leq 20°$, between them.

It is structurally especially favorable if the two faces are embodied as essentially plane, or flat.

In another advantageous feature of the invention, the two faces are embodied as concave and/or convex on their sides facing one another. As a result of this as well, the direction passage of the coherent electromagnetic radiation can be prevented without additional shielding means.

It is naturally also conceivable for one face, on its side facing toward the other face, to be embodied as concave while the other face is embodied as convex.

Another variation is that the two faces extend in concave and/or convex fashion toward one another on their sides converging toward one another.

A reflection of the incident coherent electromagnetic radiation in the direction of the radiation source can also be achieved if the two faces, on their sides toward one another, have portions that extend in concave and/or convex fashion.

In another advantageous feature of the invention, at least one baffle is disposed on at least one face. As a result, by structurally simple means, redundance is created, so that in every case, a direct passage of the coherent electromagnetic radiation from the inlet opening through the other opening is prevented.

To keep the reverse radiation of the coherent electromagnetic radiation in the direction of the radiation source as slight as possible, the faces and/or the at least one baffle have a surface or a surface coating of a material that absorbs the electromagnetic radiation. This assures that the intensity of the radiation decreases upon each reflection from one of the surfaces. Even if unwanted scattering of the coherent electromagnetic radiation occurs between the two faces, this provision of the invention reduces radiation that might emerge into the environment to an amount that is harmless to organic tissue.

It is naturally also conceivable for the faces and/or the at least one baffle to have a metallized surface or a metallized surface coating, which likewise enhances the degree of reflection of the coherent electromagnetic radiation, entering between the coherent electromagnetic radiation in the direction of the radiation source between the faces converging toward one another.

In another particular concept of the invention, the device of the invention for shielding coherent electromagnetic radiation is used in work processes in which complete encapsulation is either impossible or too time-consuming. In particular, it is provided that the device of the invention be used for shielding laser radiation in a laser booth.

The laser booth may be provided with laser-protection walls and a turntable, with at least one and preferably two recesses for fixing the workpiece. According to the invention, a laser-protection wall that can rotate with the turntable is located on the turntable, and shielding devices are disposed on its peripheral regions.

The shielding devices of the invention may be provided at all the gaps that occur between the turntable, or the laser-protection wall rotating with it, and the adjoining wall of the laser booth. It is understood, however, also to be possible, depending on the operating range of the laser employed, to provide for instance only one lateral shielding device or two lateral shielding devices and/or only one upper or only one lower shielding element, or one upper and one lower shielding element. At at least one lateral and/or at least one horizontally extending peripheral region of the laser-protection wall rotating with the turntable, there is a face which, with the adjacent laser-protection walls themselves or with a fixed face located on them forms converging faces. Overall, the result is reflection of the electromagnetic radiation into the inner chamber of the laser booth.

Further objects, advantages, characteristics, and possible uses of the present invention will become apparent from the ensuing description of an exemplary embodiment in conjunction with the drawings. All the characteristics described and/or shown in the drawing, either alone or in arbitrary appropriate combination, form the subject of the present invention, regardless of how the invention is summarized in the claims and regardless of the claims dependency.

Figure 4:
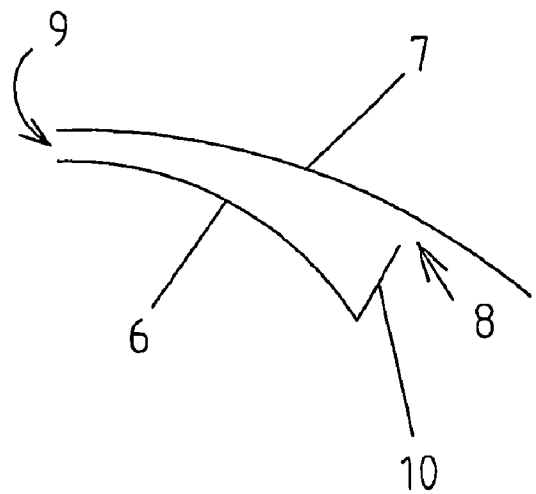
Figure 5:
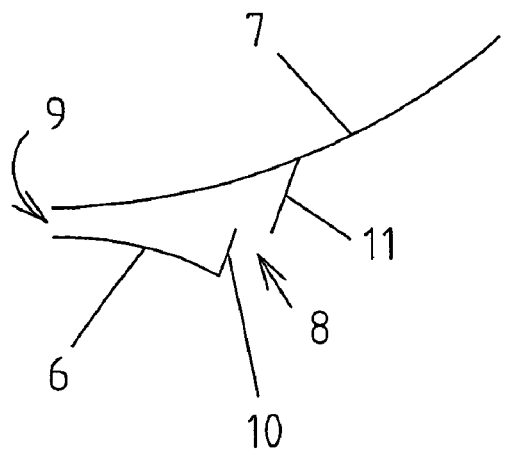
Figure 6:
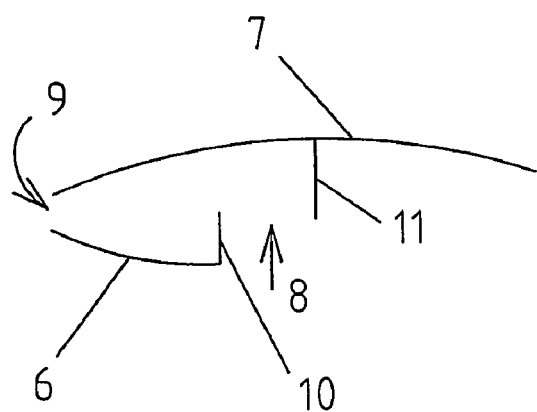

Shown are:

FIG. 1, a laser welding booth in the prior art;

FIG. 2, a laser welding booth with devices according to the invention, located laterally on a turntable, for shielding coherent electromagnetic radiation;

FIG. 2a, the laser booth of FIG. 2, in which devices for shielding coherent electromagnetic radiation are provided at the horizontally extending gaps;

FIG. 3, an enlarged illustration of the device of the invention of FIG. 2, in a plan view;

FIG. 4, a device according to the invention of FIGS. 2, 2a and 3, with an additional baffle; and FIGS. 5 through 8, further embodiments of the device of the invention.

FIG. 2 shows a laser booth 1, with a device which causes a reflection of the otherwise exiting laser radiation back into the booth interior 12.

On a turntable 3 for receiving workpieces, a laser-protection wall 20 is fixedly disposed and is rotatable with the turntable 3 about the pivot axis 4. To prevent any laser radiation from being able to escape to the outside through the openings or gaps that result between the laser-protection wall 20, located on the turntable 3, and the adjacent outer laser-protection walls 2, a wall with a face 6 is disposed on the laser-protection wall 20. This face 6, as FIG. 3 shows, converges toward a second face 7, which is disposed on the outer laser-protection wall 2. By means of the two faces 6, 7, two openings 8 and 9 are defined, and reference numeral 14 indicates the laser radiation arriving from the booth interior 12.

The curvatures of the faces 6 and 7 are dimensioned such that upon a rotation of the turntable 3 about the pivot axis 4, the face 7, or the wall corresponding to it, is located outside the radius of collision with the turntable 3.

Because of the convex embodiment of both the face 6 and the face 7 on their sides facing toward one another, it is attained that coherent electromagnetic radiation cannot escape to the outside from the inner chamber 12 of the laser booth. Instead, the radiation is reflected multiple times at the faces 6 or 7, until a back reflection of the radiation into the inner chamber 12 occurs. The radii of curvature of the interacting faces 6, 7 are selected such that an angle of ≦20° is formed between their tangents.

Advantageously, devices for shielding the laser radiation are provided at all of the gaps that result between the turntable 3, or the laser-protection wall 20 rotating jointly with the turntable 3, and the adjoining walls 2 of the laser booth 1. For the sake of greater clarity, in FIG. 2, only the faces 6 laterally disposed on the jointly rotating laser-protection wall 20 and the faces 7 corresponding with them on the vertical walls 2 of the laser booth 1 are shown. In FIG. 2a, the disposition of the face 6 on the upper, horizontally extending peripheral region of the jointly rotating laser-protection wall 20, the associated face 7 on the upper boundary of the opening in the laser booth 1, and the face 6 on the lower boundary of the opening in the booth wall 2 are shown; the associated face 7 is formed by the wall of the turntable 3 itself.

The faces 6 and 7 have a surface or a surface coating that comprises an electromagnetic radiation-absorbing material. It is naturally also conceivable for the faces to have a mirrored surface. Because of the high degree of absorption of the faces 6 and 7, the radiation, after multiple reflections, is in every case attenuated such that the intensity of the radiation no longer suffices to harm organic tissue.

To further increase the degree of absorption of the electromagnetic radiation between the faces 7 and 6 and thus the intensity of the coherent electromagnetic radiation, it is possible, as shown in FIG. 4, for baffles 10 to be provided in addition. The entry angle for the coherent electromagnetic radiation before striking one of the faces 6 or 7 is selected to be so large that it is no longer possible, because of the multiple reflections and the resultant back reflection, for the coherent electromagnetic radiation entering through the opening 8 to reach the vicinity of the opening 9. Because of the high degree of absorption of the surfaces of the faces 6 and 7 and optionally also of the baffle 10, the intensity of the radiation reflected back into the inner chamber is furthermore very slight.

Figure 7:
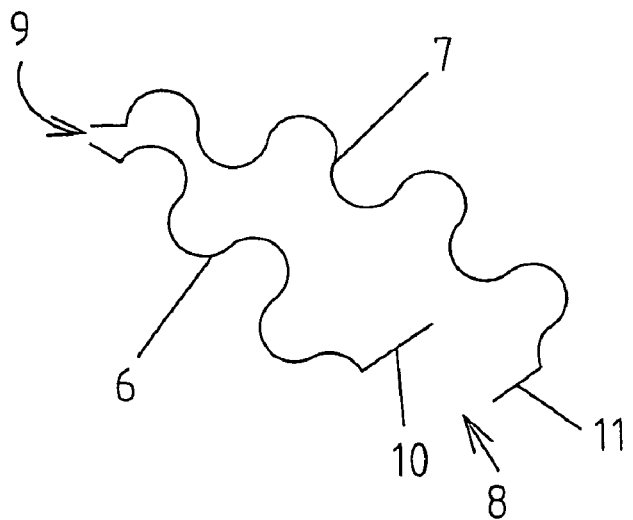

FIGS. 5 through 8 show further exemplary embodiments of the invention with different designs of converging faces 6 and 7. The faces 6, 7 in FIG. 5 converge in convex-convex fashion while in FIG. 6 they converge in concave-concave fashion. FIG. 7 conversely shows faces 6 and 7 that contain both concave and convex elements. Two respective baffles 10 and 11 are shown, which prevent a direct passage of the coherent electromagnetic radiation through the openings 8 and 9.

Figure 8:
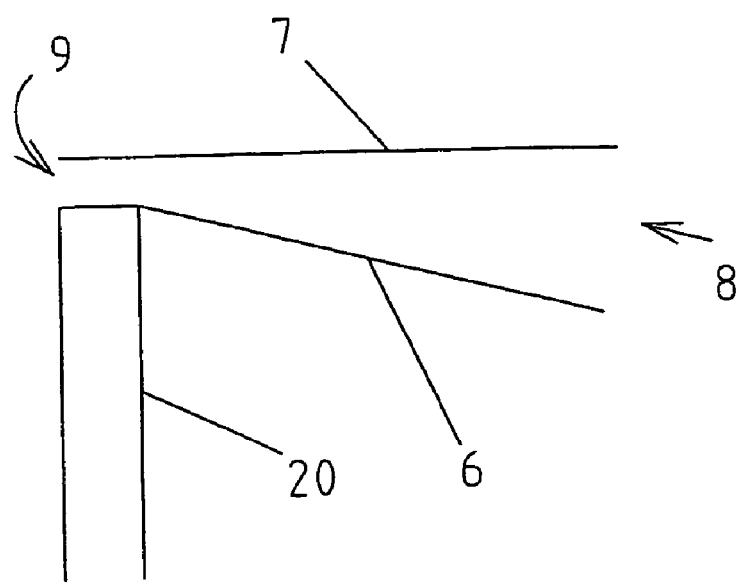

In FIG. 8, the converging faces 6, 7, or corresponding wall elements, are embodied as essentially flat, which represents a major structural advantage over the other embodiments.

It is furthermore conceivable for the device of the invention for shielding coherent electromagnetic radiation to be used in all work processes in which a complete encapsulation is not possible, or for economic reasons is too time-consuming. For instance, the device of the invention can also be used in doors, where once again the exit of coherent electromagnetic radiation from an inner chamber that has a radiation source must be prevented.

LIST OF REFERENCE NUMERALS

1 Laser protection booth
2 Laser-protection wall
3 Turntable
4 Pivot axis
5 Lifting gate
6 Face
7 Face
8 Opening
9 Opening
10 Baffle
11 Baffle
12 Inner chamber
14 Radiation
20 Laser-protection wall

The invention claimed is:

1. A laser booth having external laser-protection walls, with a turntable with recesses for the workpieces to be machined, with a laser-protection wall that rotates with the turntable and is disposed on the turntable, with shielding devices for shielding coherent electromagnetic radiation, said shielding devices being located on lateral peripheral regions of said laser-protection wall, wherein on at least one lateral or at least one horizontally extending peripheral region of the laser-protection wall rotating with turntable there is a first face with a curvature, characterized in that adjacent to said first face a stationary laser-protection wall or a stationary second face disposed on said laser-protection wall is arranged, said laser-protection wall or said second face having a curvature, said first and second faces converging toward one another at least in portions and between which two diametrically opposed openings are formed, one opening being directed toward the booth interior, the other opening being directed toward the booth exterior, the curvature of said first and second faces is adapted to prevent a direct passage of coherent electromagnetic radiation through said one opening from the booth interior and through said other opening toward the booth exterior.

2. The device in accordance with claim 1 wherein the first and second faces have different curvatures.

3. The device in accordance with claim 1, characterized in that the surface, toward the second face, of the first face is embodied as convex, and the surface, toward the first face, of the second face is embodied as concave.

4. The device in accordance with claim 1, characterized in that the surfaces, toward one another, of the two faces are embodied as concave.

5. The device in accordance with claim 1, characterized in that the surfaces, toward one another, of the two faces are embodied as convex.

6. The device in accordance with claim 1, characterized in that the surfaces, toward one another, of the two faces each have alternating concave and convex elements.

7. The device in accordance with claim 1, characterized in that the faces have a surface of electromagnetic radiation-absorbing material.

8. The device in accordance with claim 1, characterized in that at least one baffle located on one of the faces is provided.

9. The device in accordance with claim 8, characterized in that the at least one baffle has a surface of electromagnetic radiation-absorbing material.

10. The device in accordance with claim 8, characterized in that the faces and/or the at least one baffle have a metallized surface or surface coating.

* * * * *